March 27, 1951     E. C. KEEP ET AL     2,546,189
WILD DUCK DECOY
Filed Feb. 24, 1948
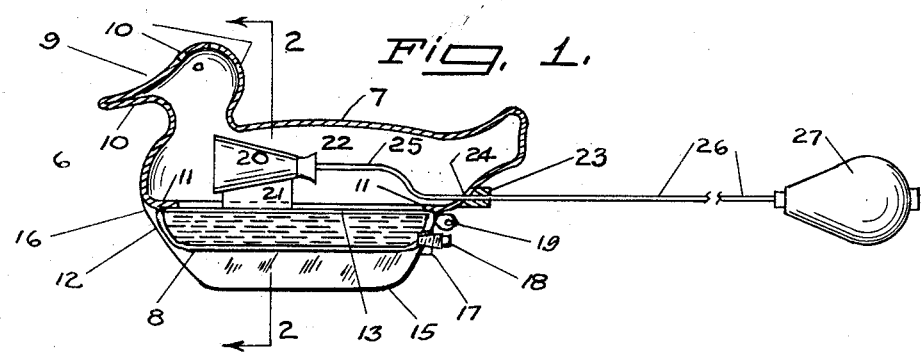
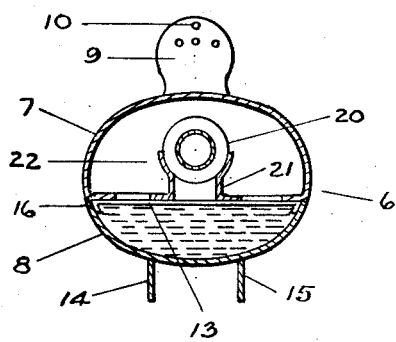
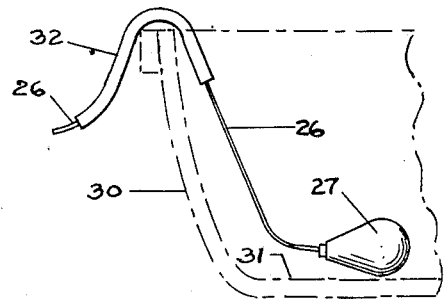
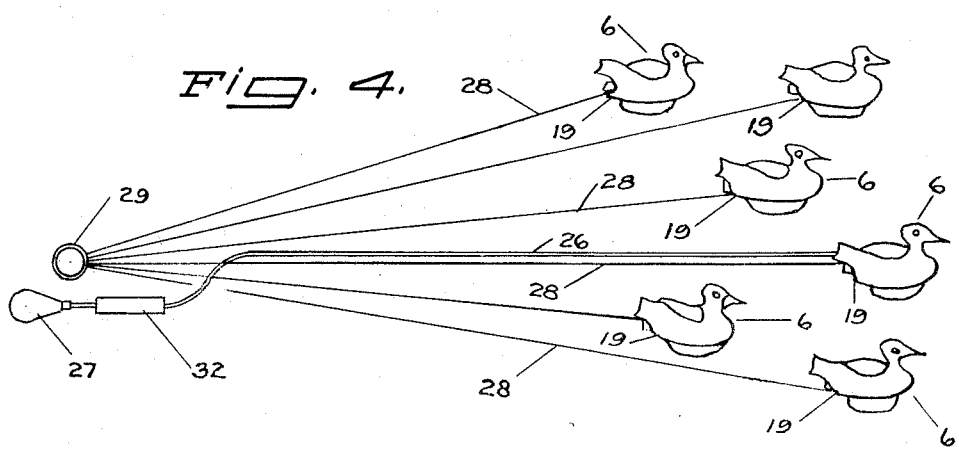
INVENTORS
EDWARD C. KEEP
ELEANOR L. KEEP
BY Edward C. Healy
ATTORNEY

UNITED STATES PATENT OFFICE 2,546,189

WILD DUCK DECOY

Edward C. Keep and Eleanor L. Keep, Richmond, Calif., assignors of one-fourth to Julia C. Janney, Richmond, Calif.

Application February 24, 1948, Serial No. 10,486

1 Claim. (Cl. 43—3)

This invention relates to an improved wild duck decoy and has particular reference to decoys made in the form of ducks and other types of water fowl and are used by hunters for attracting the attention of the game, whereby the same are lured in close range to the hunter.

An object of the present invention is to provide a body simulating a fowl, such as a duck, and to position in the said body a conventional call sounding decoy horn and to operate the said horn from a remote location through the medium of a suitable flexible air bulb or bellows connected to the said horn by a small elongated flexible hose.

Another object of the present invention is to preferably construct the body of the duck out of a suitable thin sheet metal or plastic, and to form the said body in two horizontal sections positioned one above the other and substantially secured together in a water tight manner.

A further object of the present invention is to weight the body for retaining the same in the water by utilizing the lower compartment as a water compartment and to position the decoy horn in the upper compartment free from the said water.

A still further object of the present invention is to perforate the head of the duck, which head forms a portion of the upper compartment, the perforation serving to emit the sounds of the call horn.

A still further object of the present invention is to employ the decoys in sets of six to simulate a flock of ducks and to connect the same one to the other by a series of long flexible rust proof wires connected to a small ring and to secure the said ring to a boat or other suitable object positioned in remote location.

A still further object of the present invention is to provide a decoy of the character described that is simple in construction, economical to maufacture, positive in operation and highly efficient and serviceable in use.

Other objects and advantages will be apparent during the course of the following description.

In the accompanying drawing forming a part of the specification, wherein for the purpose of illustration like numerals designate like parts throughout the same, Fig. 1 is a central vertical longitudinal sectional view of a fowl simulating a duck and showing the call horn positioned therein, Fig. 2 is a vertical sectional view taken on line 2—2 of Fig. 1, looking in direction of the arrows, Fig. 3 is an elevational view illustrating a method for supporting the flexible tubing on the side wall of a boat, and Fig. 4 is a diagrammatic view of a plurality of decoys illustrating how they are all connected to a remotely positioned ring.

Referring in detail to the drawing and the numerals thereof, the numeral 6 designates, as a whole, a body simulating a duck, which body preferably comprises an upper hollow section 7 and a lower hollow section 8, constructed of thin sheet metal or plastic, but may be made of any other suitable material. The upper section 7 includes a head portion 9, perforated, as at 10, and is formed with inner extending bottom flanges 11, as shown to advantage in Figs. 1 and 2. The lower section 8 is preferably constructed of a curved bottom portion 12 and a top cover 13 substantially fixed thereto. A pair of vertical fins 14 and 15 are fixed to the bottom portion 12 and project downwardly therefrom for stabilizing the body in water and retaining the same in an up-right position. The two body sections 7 and 8 are welded or otherwise suitably secured one to the other in a water tight manner as at 16, whereby water is prevented from entering the top section. The said sections can be outwardly flanged and removable together if desired. A suitable lug 17 is fixed to the rear wall of the lower section and said lug and wall are tapped for accommodating a pipe plug 18, whereby water can be retained in the lower section's compartment and also emptied therefrom. A suitable eyebolt 19 is also fixed in the lower section's rear wall to provide means for securing a wire or the like.

A conventional decoy horn 20 is positioned on two angle members 21 and welded thereto, which angle members are welded or otherwise suitably secured to the top cover 13 of the lower body section 8. The said horn is thus retained in the compartment 22 of the upper body section 8 as disclosed to advantage in Figs. 1 and 2. A lug 23 is fixed to the rear portion of the upper section 8, which upper section is apertured as at 24 for accommodating an inlet air pipe 25 that extends into the inlet end portion of the decoy horn 20. A small elongated rubber tubing 26, or the like, is fixed in the outer end portion of the said aperture 24, which tubing extends to a conventional air bulb 27 as illustrated in Figs. 1 and 4. The said air bulb can be a conventional bellows or any other suitable air intaking and expelling means.

The illustration disclosed in Fig. 4 shows a plurality of ducks simulating a flock of the same, Suitable flexible wires or cords 28 are secured to the eyebolts 19 of each of the ducks and extend therefrom to a ring 29 and are secured thereto. The said ring can be secured to a boat or any other remote object. When employing a plurality of the ducks only one need have the decoy operated. The numeral 30 in Fig. 3 designates a fragment of an ordinary row boat, shown in dot and dash lines, and the numeral 31 designates the floor thereof. When using a boat in connection with the duck hunting a curved rigid tube 32 is provided for supporting the rubber tubing 26 over the side wall of the boat and to prevent any kinks from being formed in the tubing. The air bulb can rest on the floor and be operated by the foot of the hunter enabling both arms to be continuously kept free.

It is to be understood that the form of our invention herewith shown and described is to be taken as a preferred example of the same and that various changes relative to the shape, size, material and arrangement of parts may be resorted to without departing from the spirit of the invention or the scope of the subjoined claim.

Having thus described our invention, we claim:

A wild duck decoy of the character described comprising a body member simulating a duck, the said body member being composed of two separate hollow sections positioned one above the other forming two separate compartments, means securing the sections together, a duck decoy sounding horn positioned in the upper compartment, said upper compartment having a plurality of perforations for emitting decoy sounds produced by the horn therein, an elongated rubber tubing leading from the horn to a remote location, an air expelling bulb secured to the outer extremity of the rubber tubing at the remote location for operating the horn, whereby the decoy sounds are produced, a wall of the lower compartment having a threaded opening in it for enabling water to be conveyed therein to weight the lower portion of the said body member, a threaded plug for closing said opening, and a pair of vertical fins extending from the lower portion of the body for stabilizing the body when the same is in the water.

EDWARD C. KEEP.
ELEANOR L. KEEP.

REFERENCES CITED

The following references are of record in the file of this patent:

UNITED STATES PATENTS

| Number | Name | Date |
| --- | --- | --- |
| 430,565 | Curlin | June 17, 1890 |
| 1,469,613 | Bailey | Oct. 2, 1923 |
| 2,227,242 | Boutin | Dec. 31, 1940 |
| 2,237,194 | Ohnmacht | Apr. 1, 1941 |